(12) United States Patent
Chakra et al.

(10) Patent No.: US 11,119,973 B2
(45) Date of Patent: Sep. 14, 2021

(54) MANAGING WHITE SPACE IN A PORTAL WEB PAGE

(71) Applicant: International Business Machines Corporation, Armonk, NY (US)

(72) Inventors: Al Chakra, Cary, NC (US); Adam R. Cook, Apex, NC (US); Jonathan J. Lidaka, Raleigh, NC (US); Ryan E. Smith, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/597,748

(22) Filed: Oct. 9, 2019

(65) Prior Publication Data
US 2020/0042493 A1     Feb. 6, 2020

Related U.S. Application Data

(63) Continuation of application No. 15/795,426, filed on Oct. 27, 2017, now Pat. No. 10,467,186, which is a continuation of application No. 12/027,381, filed on Feb. 7, 2008, now Pat. No. 9,817,822.

(51) Int. Cl.
*G06F 17/00* (2019.01)
*G06F 16/00* (2019.01)

(52) U.S. Cl.
CPC .................................. *G06F 16/00* (2019.01)

(58) Field of Classification Search
None
See application file for complete search history.

(56) References Cited

U.S. PATENT DOCUMENTS

| | | | |
|---|---|---|---|
| 5,347,981 | A | 9/1994 | Southern |
| 5,387,981 | A | 2/1995 | Orlen et al. |
| 5,677,563 | A | 10/1997 | Cronin et al. |
| 5,757,963 | A | 5/1998 | Ozaki et al. |
| 6,121,981 | A | 9/2000 | Trower, II |

(Continued)

FOREIGN PATENT DOCUMENTS

| | | |
|---|---|---|
| WO | WO 2004/031882 | 4/2004 |
| WO | WO 2005/106710 | 11/2005 |

OTHER PUBLICATIONS

Hesmer et al, "Portlet Development Guide Working with the Portlet API 1_1", pp. 1-116, Apr. 2, 2002, URL: http://e_bis_business_ utah_edu/resources/wps_proJecthtm.

(Continued)

*Primary Examiner* — Mustafa A Amin
(74) *Attorney, Agent, or Firm* — Fabian VanCott; Steven L. Nichols

(57) ABSTRACT

Embodiments of the present invention address deficiencies of the art in respect to web page layout and provide a novel and non-obvious system for managing white space in a web page. In one embodiment of the invention, a method for managing white space in a web page includes detecting white space adjacent to a non-rectangular shaped portlet rendered on the web page. The method further includes measuring a non-rectangular shape of the white space and selecting a graphic having a shape congruent with the shape of the white space. The method further includes rendering the graphic that was selected into the white space.

20 Claims, 2 Drawing Sheets

(56) References Cited

U.S. PATENT DOCUMENTS

| | | | |
|---|---|---|---|
| 6,182,050 B1 | 1/2001 | Ballard | |
| 6,771,801 B1 | 8/2004 | Fisher | |
| 7,266,806 B2 | 9/2007 | Choi et al. | |
| 7,685,083 B2 | 3/2010 | Fairweather | |
| 7,689,909 B1 | 3/2010 | Szuszczewicz | |
| 7,703,022 B2 | 4/2010 | Arthurs et al. | |
| 7,729,001 B2 | 6/2010 | Perronnin | |
| 7,971,136 B2 * | 6/2011 | Menachem | G09G 5/14 715/232 |
| 8,165,915 B1 | 4/2012 | Lucash | |
| 8,539,351 B2 | 9/2013 | Baciu | |
| 8,577,181 B1 | 11/2013 | Badros | |
| 2001/0029455 A1 | 10/2001 | Chin et al. | |
| 2002/0133565 A1 | 9/2002 | Huat | |
| 2003/0126558 A1 | 7/2003 | Griffin | |
| 2003/0128234 A1 | 7/2003 | Brown | |
| 2003/0167315 A1 | 9/2003 | Chowdhry et al. | |
| 2004/0030795 A1 | 2/2004 | Hesmer et al. | |
| 2004/0183831 A1 | 9/2004 | Ritchy et al. | |
| 2004/0199373 A1 | 10/2004 | Shieh | |
| 2004/0199541 A1 | 10/2004 | Goldberg et al. | |
| 2004/0230947 A1 | 11/2004 | Bales | |
| 2005/0021765 A1 | 1/2005 | Flores et al. | |
| 2005/0065913 A1 | 3/2005 | Lillie et al. | |
| 2005/0137958 A1 | 6/2005 | Huber et al. | |
| 2006/0026557 A1 | 2/2006 | Petri | |
| 2006/0031419 A1 | 2/2006 | Huat | |
| 2006/0053048 A1 | 3/2006 | Tandetnik | |
| 2006/0064422 A1 | 3/2006 | Arthurs et al. | |
| 2006/0080612 A1 | 4/2006 | Hayes et al. | |
| 2006/0184882 A1 | 8/2006 | Molander et al. | |
| 2006/0200751 A1 | 9/2006 | Underwood et al. | |
| 2006/0212798 A1 | 9/2006 | Lection et al. | |
| 2007/0006083 A1 | 1/2007 | Daniels et al. | |
| 2007/0074109 A1 | 3/2007 | Nagahara et al. | |
| 2007/0112630 A1 | 5/2007 | Lau et al. | |
| 2007/0192686 A1 | 8/2007 | Fortes et al. | |
| 2007/0204209 A1 | 8/2007 | Truelove | |
| 2007/0214449 A1 | 9/2007 | Choi et al. | |
| 2007/0219842 A1 | 9/2007 | Bansal et al. | |
| 2007/0253023 A1 | 11/2007 | Mitsubori | |
| 2007/0300152 A1 | 12/2007 | Baugher | |
| 2008/0059571 A1 | 3/2008 | Khoo | |
| 2008/0066079 A1 | 3/2008 | Nauerz et al. | |
| 2008/0082912 A1 | 4/2008 | Atkins | |
| 2008/0123138 A1 * | 5/2008 | Banerjee | H04N 1/00132 358/1.18 |
| 2008/0126537 A1 | 5/2008 | Engehausen et al. | |
| 2008/0168119 A1 | 7/2008 | Van Der Helm et al. | |
| 2008/0306824 A1 | 12/2008 | Parkinson | |
| 2009/0037841 A1 | 2/2009 | Bell et al. | |
| 2009/0094096 A1 * | 4/2009 | Riise | G06Q 30/0269 705/14.1 |
| 2009/0113474 A1 | 4/2009 | Green | |
| 2009/0171750 A1 | 7/2009 | Zhou et al. | |
| 2009/0265338 A1 | 10/2009 | Kraft et al. | |
| 2009/0265611 A1 | 10/2009 | Sengamedu et al. | |
| 2009/0287775 A1 | 11/2009 | Ng et al. | |
| 2009/0292800 A1 | 11/2009 | Ng et al. | |
| 2009/0307623 A1 | 12/2009 | Agarawala et al. | |

OTHER PUBLICATIONS

"Interface CSSProperty"; Feb. 28, 2005; http://www-act.ucsd.edu/bpi/ps/javadocs/vap/com/vignette/portal/text/processor/css/CSSProperty.html; 5 pages.

"White space | formatting"; Nov. 7, 2001; http://archive.gingerall.cz/archives/public/sablot2001/msg01537.html; 2 pages.

* cited by examiner

MANAGING WHITE SPACE IN A PORTAL WEB PAGE

CROSS-REFERENCE TO RELATED APPLICATIONS

This application is a Continuation of U.S. patent application Ser. No. 15/795,426, filed Oct. 27, 2017, which claims priority to U.S. patent application Ser. No. 12/027,381, filed Feb. 7, 2008, the entirety of each which is incorporated herein by reference.

BACKGROUND OF THE INVENTION

Field of the Invention

The present invention relates to the field of portals and portlets and more particularly to the management of white spaces around portlets.

Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

One of the features of portlets is that they can be rendered in any of a variety of shapes besides standard cubic and rectangular shapes. A portlet rendered in an irregular shape such as a circle, however, results in the creation of white space. In page layout and illustration, white space is that portion of a page left unmarked. This includes the space between portlets, graphics, columns, lines of type or figures. White space is generally regarded as wasted space since there is no content present in the white space. With web page real estate at a premium, it is desirable to reduce the amount of white space rendered on portal web pages.

In addition to the creation of white space, a portlet rendered in an irregular shape results in the creation of irregularly-shaped, non-rectangular white space. This poses additional challenges when rendering a portal web page. Conventionally, graphics and other illustrations are drawn in a rectangular or cubic space that allows for easy rendering. Rendering in an irregular, non-rectangular shape, however, requires a higher level of processing so as to fit a rectangular graphic into an irregular shape.

Therefore, there is a need to improve upon the processes of the prior art and more particularly for a more efficient way for managing irregular white space around portlets.

BRIEF SUMMARY OF THE INVENTION

Embodiments of the present invention address deficiencies of the art in respect to web page layout and provide a novel and non-obvious system for managing white space in a web page. In one embodiment of the invention, a method for managing white space in a web page includes detecting white space adjacent to a non-rectangular shaped portlet rendered on the web page. The method further includes measuring a non-rectangular shape of the white space and selecting a graphic having a shape congruent with the shape of the white space. The method further includes rendering the graphic that was selected into the white space.

In another embodiment of the invention, a method for managing white space in a web page is provided. The method includes detecting white space adjacent to a non-rectangular shaped portlet rendered on the web page. The method further includes measuring a non-rectangular shape of the white space and selecting a graphic that fits within the shape of the white space and that includes content pertinent to the content of the portlet. The method further includes rendering the graphic that was selected into the white space.

In another embodiment of the invention, a computer program product comprising a computer usable medium embodying computer usable program code for managing white space in a web page is provided. The computer program product includes computer usable program code for detecting white space adjacent to a non-rectangular shaped portlet rendered on the web page. The computer program product further includes computer usable program code for measuring a non-rectangular shape of the white space and selecting a graphic having a shape congruent with the shape of the white space. The computer program product further includes computer usable program code for rendering the graphic that was selected into the white space.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In one embodiment of the present invention, a method for managing white space in a web page is provided. The method includes rendering on a web page a portlet having a non-rectangular shape, thereby creating irregularly-shaped white space around the portlet. Next, the white space around the portlet is detected by calculating which sections of the web page have not been rendered. Subsequently, the irregular shape of the white space is measured and its defining characteristics, such as shape and size, are stored. Then, a database of graphics is searched for a graphic having a shape and/or size congruent with the shape of the white space. If the selected graphic, such as an image or a set of text, is not the same size as the white space, then the graphic is scaled to the appropriate size. Finally, the graphic that was selected and optionally scaled is rendered into the white space.

Figure 1:
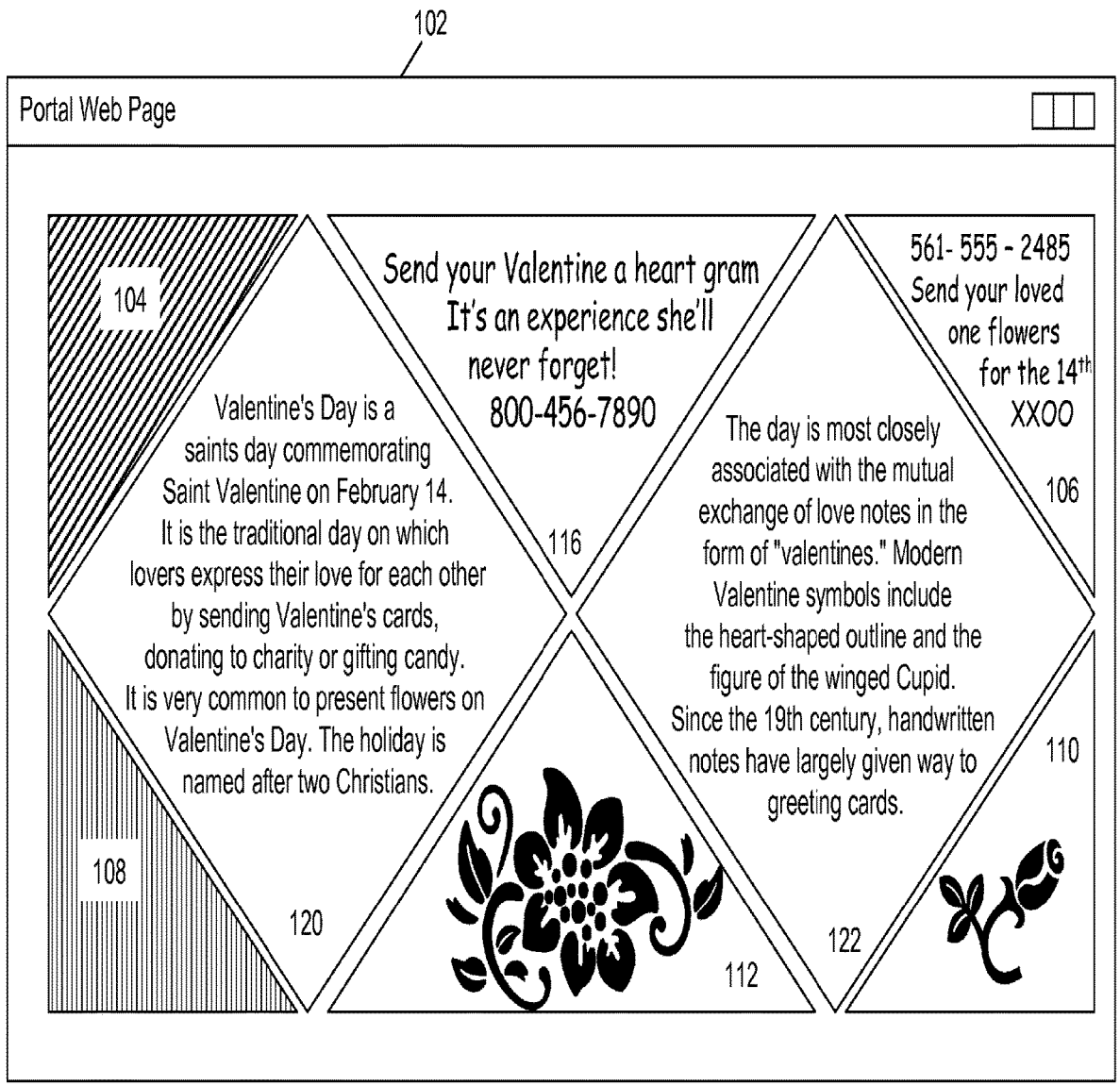
FIG. 1 is an illustration of a portal web page including a non-rectangular portlet producing irregularly-shaped white space that is populated in accordance with one embodiment of the present invention.

FIG. 1 is an illustration of a portal web page 102 including non-rectangular portlets 120, 122 producing irregularly-shaped white space 104, 106, 116, 108, 110, 112 that is populated in accordance with one embodiment of the present invention. FIG. 1 shows a web page 102 being displayed using a standard web browser. FIG. 1 further shows that the use of a non-rectangular shaped portlet, such as portlets 120, 122 shaped as a diamond, in a rectangular web page 102 results in the creation of irregular or non-rectangular shaped white space around the portlets 120, 122. Namely, the diamond-shaped portlets 120, 122 result in the creation of six triangular-shaped white space segments 104, 106, 116, 108, 112 and 110.

FIG. 1 shows that the portlets 120, 122 are populated with text content relating to a subject. Namely, the portlets 120, 122 are filled with content pertaining to the Valentine's Day holiday. The portlets 120, 122 may also include a background color such as pink.

In one embodiment of the present invention, a detected white space segment is filled with a color that complements the color or content of the portlets 120, 122. White space segments 104, 108, for example, are filled with separate colors (note the stippling in segments 104, 108, which corresponds to colors) that complement the background color of the portlets 120, 122. White space segments 104, 108 may, for example, be filled with the colors red and white, respectively, so as to complement the pink color of the background of the portlets 120, 122.

In another embodiment of the present invention, a detected white space segment is filled with a graphic that complements the color or content of the portlets 120, 122. White space segments 110, 112, for example, are each filled with a graphic that both complements the content of the portlets 120, 122 and further fits into the white space segments 110, 112, respectively. Specifically, white space segments 110, 112 are filled with graphics of flowers, which complement the Valentine's Day content of the portlets 120, 122.

In yet another embodiment of the present invention, a detected white space segment is filled with content that complements the content of the portlets 120, 122. White space segments 106, 116, for example, are each filled with a graphic that both complements the content of the portlets 120, 122 and further fits into the white space segments 110, 116, respectively. Specifically, white space segments 106, 116 are each filled with a text advertisement for a provider of Valentine's Day services, which complement the Valentine's Day content of the portlets 120, 122.

Figure 2:
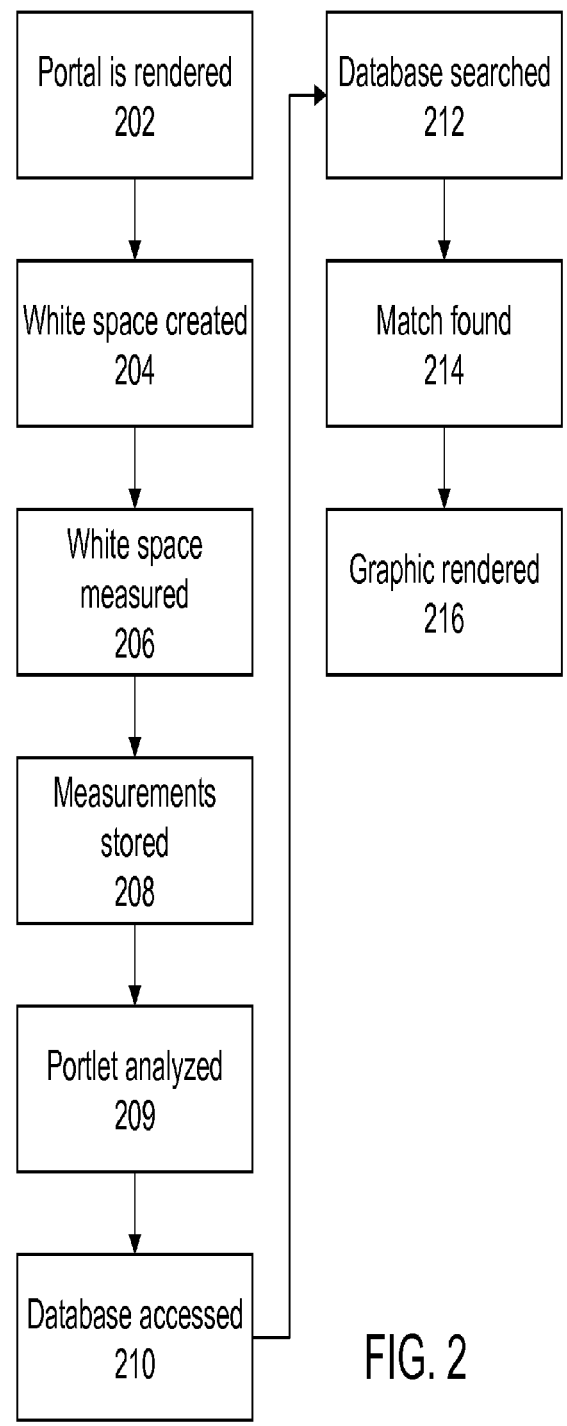
FIG. 2 is a flowchart depicting the control flow of a white space populating process, in accordance with one embodiment of the present invention.

FIG. 2 is a flowchart depicting the control flow of a white space populating process, in accordance with one embodiment of the present invention. The control flow of FIG. 2 depicts the process by which white space around a non-rectangular portlet is detected and populated with relevant graphics or data. The process of FIG. 2 refers to the web page 102 of FIG. 1.

The control flow of FIG. 2 begins with the rendering of the portlets 120, 122 in the web page 102 in step 202. Also in step 202, additional graphics, text or animations are optionally rendered onto the web page 102. Next, in step 204, the white space created on the web page 102 due to the rendering of the portlets 120, 122 is detected. This step involves calculating the area of the web page 102 on which the portlets and additional graphics, text or animations are not rendered. This area is deemed white space.

Following in step 206, the white space detected in step 204 is measured. This step entails defining the number of white space segments and defining the physical characteristics of the detected white space segments. The physical dimensions of the white space segments, defined in units of pixels, may be measured. Further, the shape and/or orientation of the white space segments may be measured. In step 208, the measured physical characteristics of each detected white space segment are stored as one or more attributes and attribute values that provide more detail about the white space segments. Possible attributes include a shape attribute and a size attribute. A shape attribute value may comprise a text string such as "diamond," "triangle" or "circle." A size attribute value may comprise a numerical value that defines the physical dimensions of a graphic, such as 20 pixels in diameter or 400 pixels of height.

In step 209, the portlets 120, 122 are analyzed. This step entails defining certain characteristics of the portlets 120, 122. The physical dimensions of the portlets 120, 122 and the shape and/or orientation of the portlets 120, 122 may be measured. Further in step 209, the measured physical characteristics of the portlets 120, 122 are stored as one or more attributes and attribute values that provide more detail about the portlets 120, 122. Possible attributes include a shape attribute, a size attribute, a color attribute and a content attribute. A color attribute value may comprise a text string such as "green," "red" or "black." A content attribute value may comprise a text string such as "advertisement" and "seasonal greeting."

In step 210, a database of graphics for rendering into the detected white space segments is accessed. The database includes a repository of graphics. A graphic may be an image, such as a photograph in a JPEG file format or a picture in a BMP file format, or an animation, such as in a Flash file format. A graphic may further be a color or a pattern. Associated with each graphic in the repository is one or more attributes and attribute values that provide more detail about the graphic. Possible attributes include a shape attribute, a size attribute, a color attribute and a content attribute. The database may be searched by the attributes associated with each graphic.

In one embodiment of the present invention, the database further includes text strings that may be entered into a detected white space segment as a graphic. In this embodiment, associated with each text string entry in the repository is one or more attributes and attribute values that provide more detail about the text.

In step 212, the database is searched for an appropriate graphic or text string for rendering into a first detected white space segment. The database may be searched using the attributes and attribute values of the white space segment, which were stored in step 208, and/or the attributes and attribute values of the portlets 120, 122, which were stored in step 209. The attributes and attribute values of the white space segment and/or the portlets 120, 122 are compared to the attributes and attribute values for the graphics or text stored in the database.

In step 214, a match is found in the database. A match may occur when one or more attributes and attribute values of the white space segment and/or the portlets 120, 122 match attributes and attribute values for the graphics or text stored in the database.

Referring to white space segment 104 of FIG. 1 as a first example, a match occurs when a content attribute value (stored as "valentine's day") of the portlet 120 matches a content attribute value (stored as "valentine's day") for a red color stored in the database. Referring to white space segment 106 of FIG. 1 as a second example, a match occurs when a content attribute value (stored as "valentine's day") of the portlet 120 matches a content attribute value (stored as "valentine's day") for a text string stored in the database. Referring to white space segment 110 of FIG. 1 as a third example, a match occurs when a shape attribute value (stored as "triangle") of the white space segment 110 matches a shape attribute value (stored as "triangle") for a graphic of a rose stored in the database. Also in this example, a content attribute value (stored as "valentine's day") of the portlet 120 matches a content attribute value (stored as "valentine's day") of the graphic of a rose stored in the database.

In an optional step, the matching graphic is scaled up or down to match the size of the white space segment. In step 216, the matching graphic is rendered in the white space segment of the web page 102. This may comprise defining a bounding rectangle around the white space segment and rendering the matching graphic in the irregular shape of the white space segment using the web browsers block rendering model. In the case where a text string is selected from the database, step 216 comprises rendering the text in the irregular shape of the white space segment.

In one embodiment of the present invention, step 216 is performed wholly or partially by an SVG script. Scalable Vector Graphics (SVG) is an XML specification and file format for describing two-dimensional vector graphics, both static and animated. SVG can be purely declarative or may include scripting that further includes links. In this embodiment, an SVG script performs the optional function of scaling the matching graphic up or down to match the size of the white space segment, as well as rendering the matching graphic in the white space segment of the web page 102.

Embodiments of the present invention can take the form of an entirely hardware embodiment, an entirely software embodiment or an embodiment containing both hardware and software elements. In a preferred embodiment, the present invention is implemented in software, which includes but is not limited to firmware, resident software, microcode, and the like. Furthermore, the present invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for managing white space in a web page, comprising:
   detecting white space adjacent to a non-rectangular shaped portlet rendered on the web page;
   measuring a non-rectangular shape of the white space;
   selecting a non-textual graphic having a shape that is the measured non-rectangular shape of the white space and has coinciding dimensions of the measured non-rectangular shape;
   defining a rectangle boundary around the white space segment; and
   rendering the non-textual graphic that was selected into the white space using a block rendering model of a web browser.

2. The method of claim 1, wherein the step of detecting further comprises:

calculating an area of the web page on which the portlet and graphics are not rendered; and designating the area of the web page as white space.

3. The method of claim 2, wherein the step of measuring further comprises:

calculating a shape of the white space; and storing an indicator of the shape of the white space.

4. The method of claim 3, wherein the step of selecting further comprises:

accessing a database of graphics, wherein each graphic is associated with a text string indicator of shape of a corresponding graphic; and selecting a non-textual graphic having the text string indicator of shape that matches the text string indicator of shape of the white space.

5. The method of claim 2, wherein the step of measuring further comprises:

calculating a size and shape of the white space;

storing an indicator of the shape of the white space; and storing an indicator of the size of the white space.

6. The method of claim 5, wherein the step of selecting further comprises:

accessing a database of graphics, wherein each graphic is associated with an indicator of shape of a corresponding graphic; and selecting a non-textual graphic having an indicator of shape that matches the indicator of shape of the white space.

7. The method of claim 6, wherein the second step of rendering further comprises:

scaling a size of the non-textual graphic to the size of the white space; and rendering the non-textual graphic that was scaled into the white space.

8. The method of claim 1, wherein the selected non-textual graphic also includes also includes content pertinent to a content of the portlet.

9. A data processing system configured for white space management in a Web page, the system comprising:

a computer with memory and at least one processor; a Web browser executing in the memory and displaying a Web page; and, a white space management module executing in the memory of the computer, the white space management module comprising computer program instructions enabled during execution to perform:

detecting white space adjacent to a non-rectangular shaped portlet rendered on the web page;

measuring a non-rectangular shape of the white space;

selecting a non-textual graphic having a shape that is the measured non-rectangular shape of the white space and has coinciding dimensions of the measured non-rectangular shape;

defining a rectangle boundary around the white space segment; and rendering the non-textual graphic that was selected into the white space using a block rendering model of the Web browser.

10. The system of claim 9, wherein the measuring further comprises:

calculating a shape of the white space;

storing an indicator of the shape of the white space;

reading content of the portlet; and storing an indicator of content of the portlet.

11. The system of claim 10, wherein the selecting further comprises:

accessing a database of graphics, wherein each graphic is associated with an indicator of shape of a corresponding graphic and an indicator of content of the corresponding graphic; and selecting a non-textual graphic having an indicator of shape that matches the indicator of shape of the white space and having an indicator of content that matches the indicator of content of the portlet.

12. The system of claim 9, wherein the measuring further comprises:

calculating a size and shape of the white space;

storing an indicator of the shape of the white space;

storing an indicator of the size of the white space;

reading content of the portlet; and storing an indicator of content of the portlet.

13. The system of claim 12, wherein the selecting further comprises:

accessing a database of graphics, wherein each graphic is associated with an indicator of shape of a corresponding graphic and an indicator of content of the corresponding graphic; and selecting a non-textual graphic having an indicator of shape that matches the indicator of shape of the white space and having an indicator of content that matches the indicator of content of the portlet.

14. The system of claim 13, wherein the rendering further comprises:

scaling a size of the non-textual graphic to the size of the white space; and rendering the non-textual graphic that was scaled into the white space.

15. A computer program product comprising a non-transitory computer usable medium embodying computer usable program code for managing white space in a web page, comprising:

computer usable program code for detecting white space adjacent to a non-rectangular shaped portlet rendered on the web page and an orientation of the white space;

computer usable program code for measuring a non-rectangular shape of the white space;

computer usable program code for selecting a non-textual graphic having:

a shape that is the measured non-rectangular shape of the white space;

coinciding dimensions of the measured non-rectangular shape; and a color that is a component part of a color of the non-rectangular shaped portlet; and computer usable program code for rendering the non-textual graphic that was selected into the white space.

16. The computer program product of claim 15, wherein the computer usable program code for detecting further comprises:

computer usable program code for calculating an area of the web page on which the portlet and graphics are not rendered; and computer usable program code for designating the area of the web page as white space.

17. The computer program product of claim 16, wherein the computer usable program code for measuring further comprises:

computer usable program code for calculating a shape of the white space; and computer usable program code for storing an indicator of the shape of the white space.

18. The computer program product of claim 17, wherein the computer usable program code for selecting further comprises:
- computer usable program code for accessing a database of graphics, wherein each graphic is associated with an indicator of shape of a corresponding graphic; and
- computer usable program code for selecting a non-textual graphic having an indicator of shape that matches the indicator of shape of the white space.

19. The computer program product of claim 16, wherein the computer usable program code for measuring further comprises:
- computer usable program code for calculating a size and shape of the white space;
- computer usable program code for storing an indicator of the shape of the white space; and
- computer usable program code for storing an indicator of the size of the white space.

20. The computer program product of claim 19, wherein the computer usable program code for selecting further comprises:
- computer usable program code for accessing a database of graphics, wherein each graphic is associated with an indicator of shape of a corresponding graphic; and
- computer usable program code for selecting a non-textual graphic having an indicator of shape that matches the indicator of shape of the white space.

\* \* \* \* \*